US007321968B1

(12) United States Patent
Capellaro et al.

(10) Patent No.: US 7,321,968 B1
(45) Date of Patent: Jan. 22, 2008

(54) METHOD AND APPARATUS FOR ENCODING, TRANSMITTING AND DECODING A DIGITAL MESSAGE

(75) Inventors: Christoph Capellaro, Oberhaching (DE); Gerhard Hoffmann, München (DE); Klaus Lukas, München (DE); Michael Munzert, München (DE)

(73) Assignee: Fujitsu Siemens Computer, Munich (DE)

( * ) Notice: Subject to any disclaimer, the term of this patent is extended or adjusted under 35 U.S.C. 154(b) by 0 days.

(21) Appl. No.: 09/446,425

(22) PCT Filed: Jun. 19, 1998

(86) PCT No.: PCT/DE98/01693

§ 371 (c)(1),
(2), (4) Date: Dec. 20, 1999

(87) PCT Pub. No.: WO99/00929

PCT Pub. Date: Jan. 7, 1999

(30) Foreign Application Priority Data

Jun. 26, 1997 (DE) ................................ 197 27 267

(51) Int. Cl.
- *H04L 9/00* (2006.01)
- *G06F 15/16* (2006.01)
- *H04K 1/00* (2006.01)

(52) U.S. Cl. ....................... 713/152; 713/150; 713/151; 709/229; 709/230; 380/255

(58) Field of Classification Search ................ 713/201, 713/150–152, 200; 11/151; 380/255, 269; 709/229–230

See application file for complete search history.

(56) References Cited

U.S. PATENT DOCUMENTS 5,651,006 A * 7/1997 Fujino et al. ............... 370/408
5,678,006 A * 10/1997 Valizadeh et al. .......... 709/223
5,870,474 A * 2/1999 Wasilewski et al. ........ 380/211
6,101,543 A * 8/2000 Alden et al. ................ 709/229

FOREIGN PATENT DOCUMENTS

| DE | 195 48 387 C1 | | 1/1997 |
|---|---|---|---|
| DE | 19548387 C1 | * | 1/1997 |
| EP | 0 645 912 A2 | | 3/1995 |

OTHER PUBLICATIONS

"IEEE 100 The Authoritative Dictionary of IEEE Standards Terms", seventh edition, p. 872, copyright 2000.*
The Simple Book, 1994.

* cited by examiner

*Primary Examiner*—Kim Vu
*Assistant Examiner*—Ponnoreay Pich
(74) *Attorney, Agent, or Firm*—Staas & Halsey LLP

(57) ABSTRACT

A method and apparatus wherein, for a network protocol a message is encoded in a first computer unit upon employment of the encoding format of the network protocol, being encoded to form an encoded message. The encoded message is subjected to a cryptographic process. The cryptographically processed message thereby formed is again encoded upon employment of the encoding format of the network protocol. The cryptographically processed message encoded in this way is transmitted from the first computer unit to the second computer unit. In the second computer unit, the received message is decoded according to the encoding format of the network protocol, and an inverse cryptographic process is applied to the decoded message. The inversely cryptographically processed message is again decoded according to the encoding format of the network protocol.

36 Claims, 11 Drawing Sheets

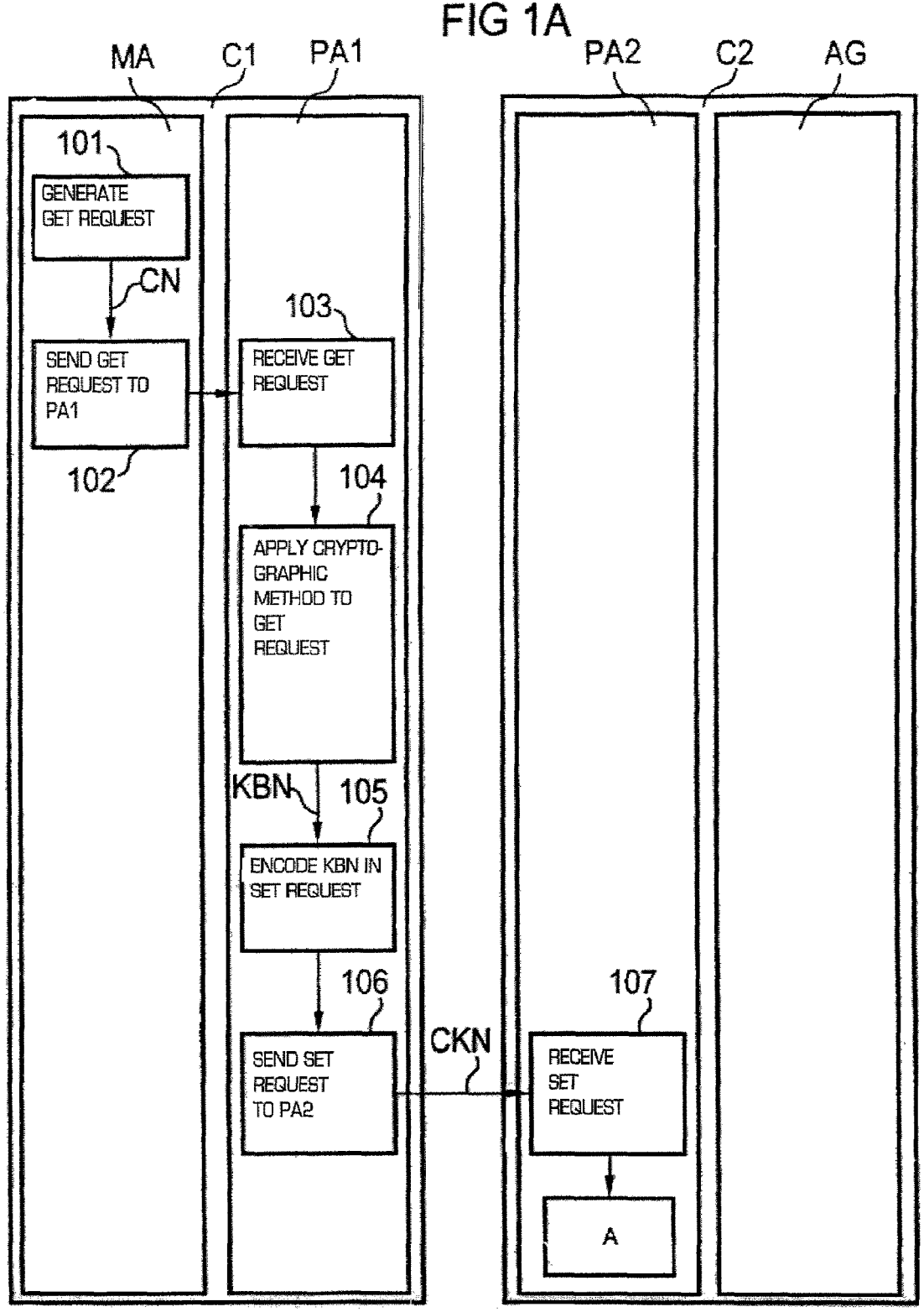

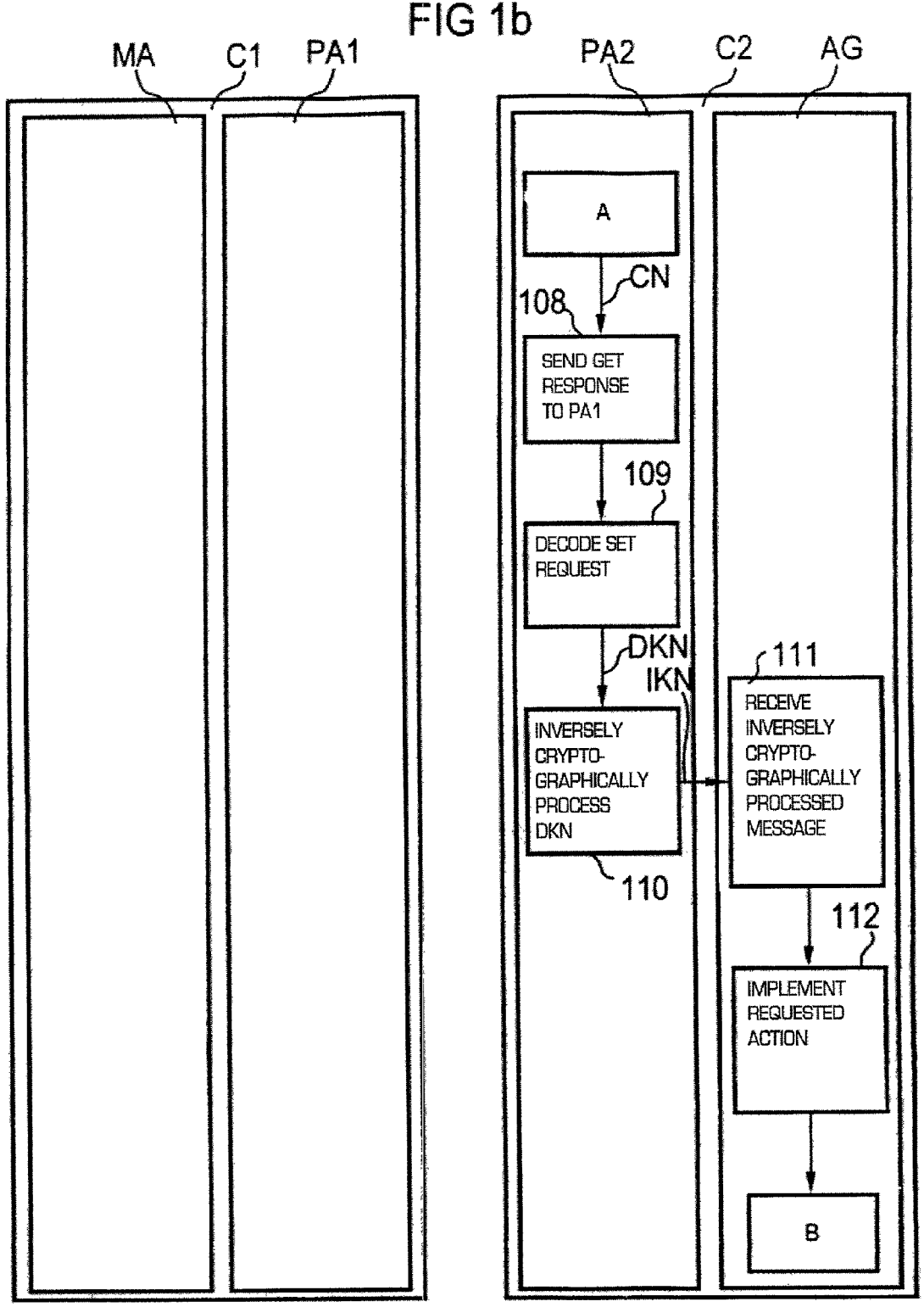

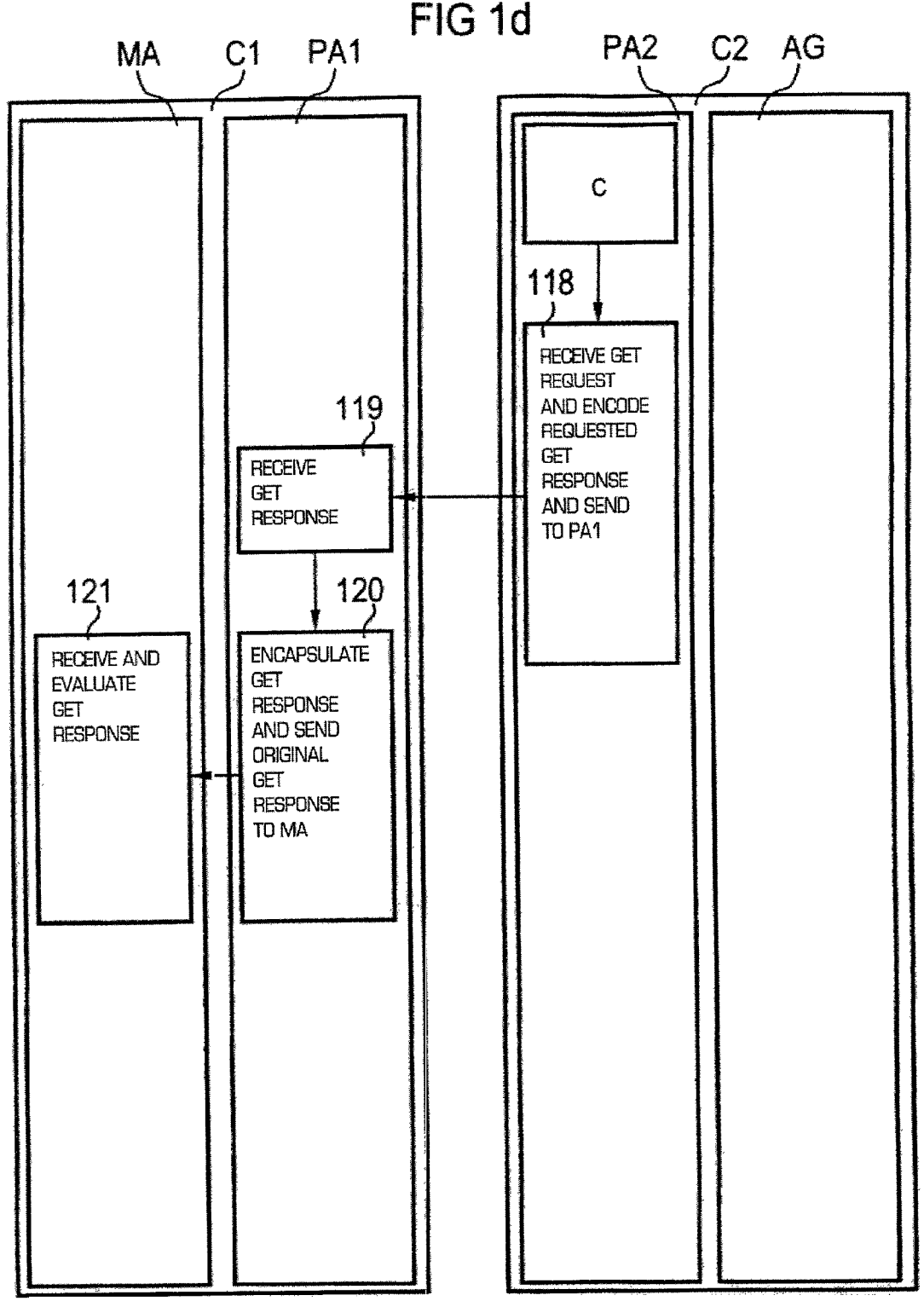

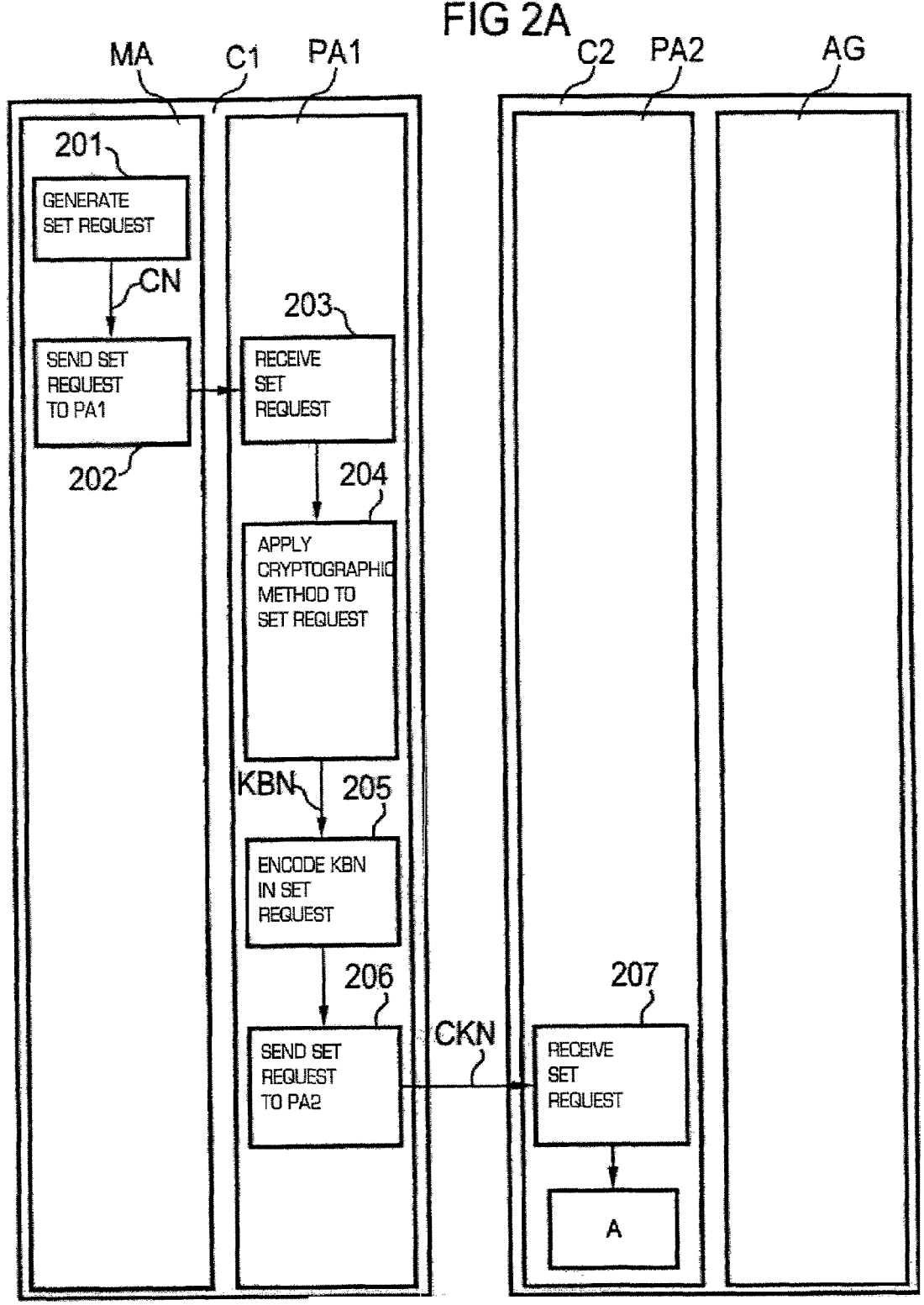

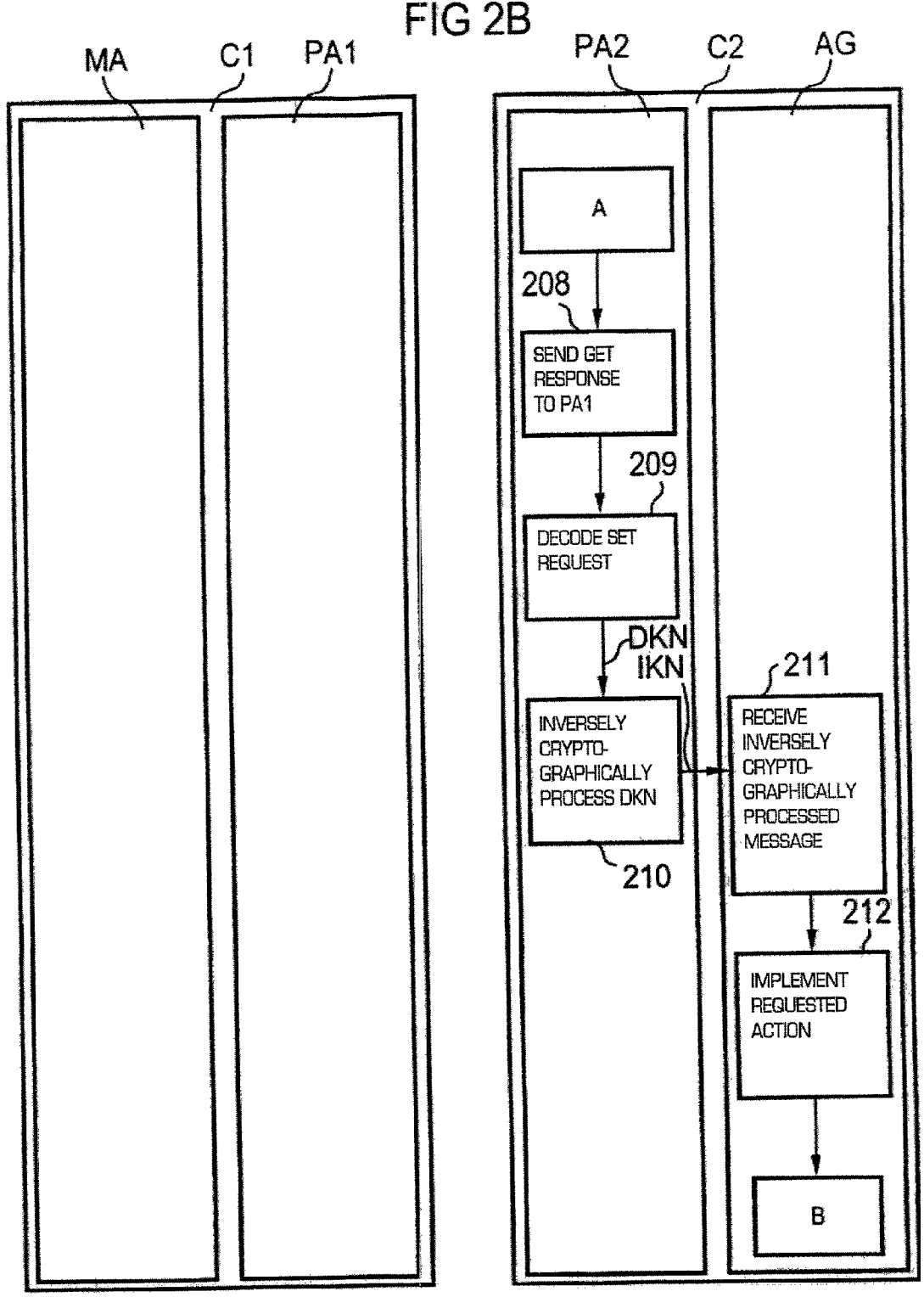

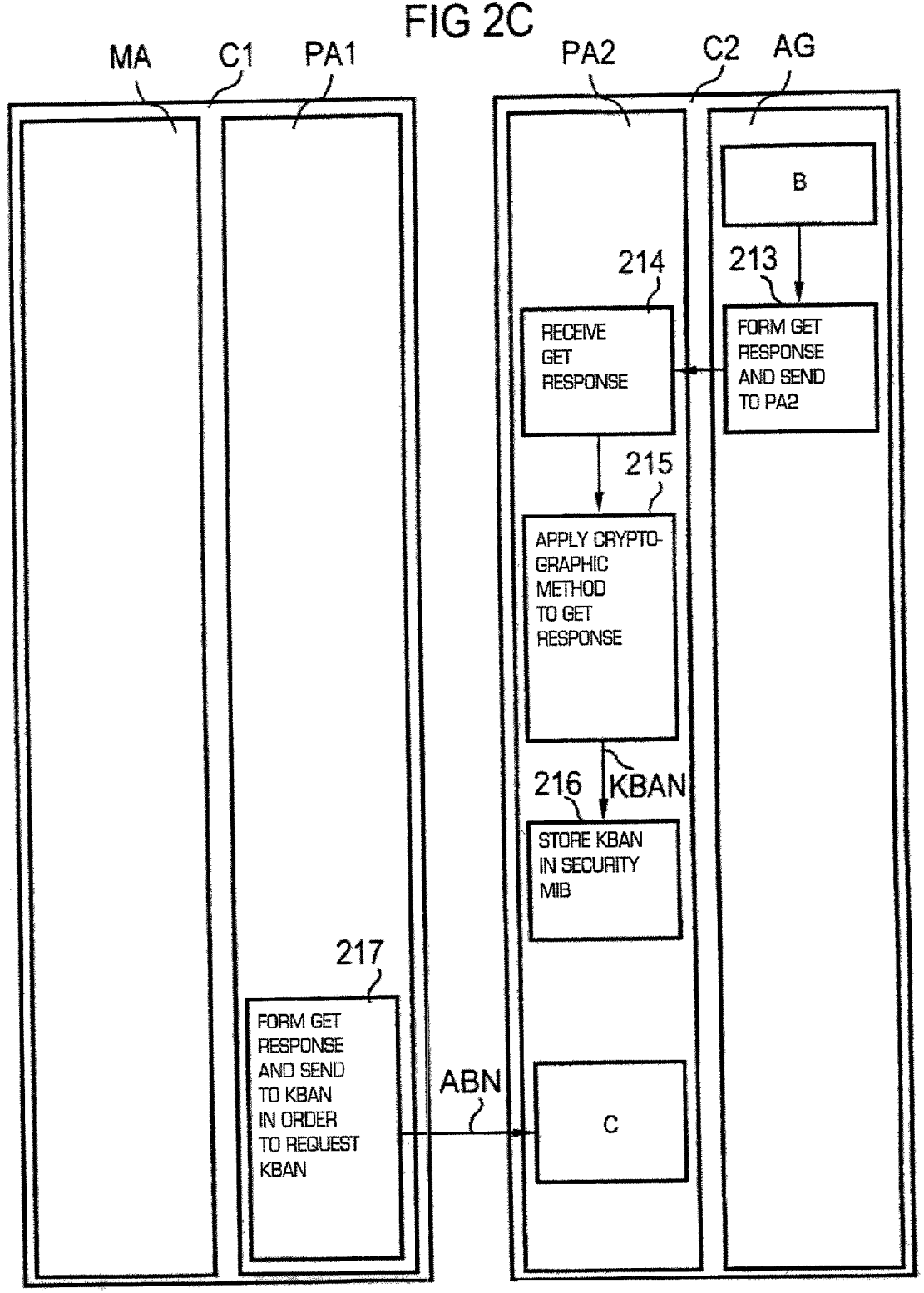

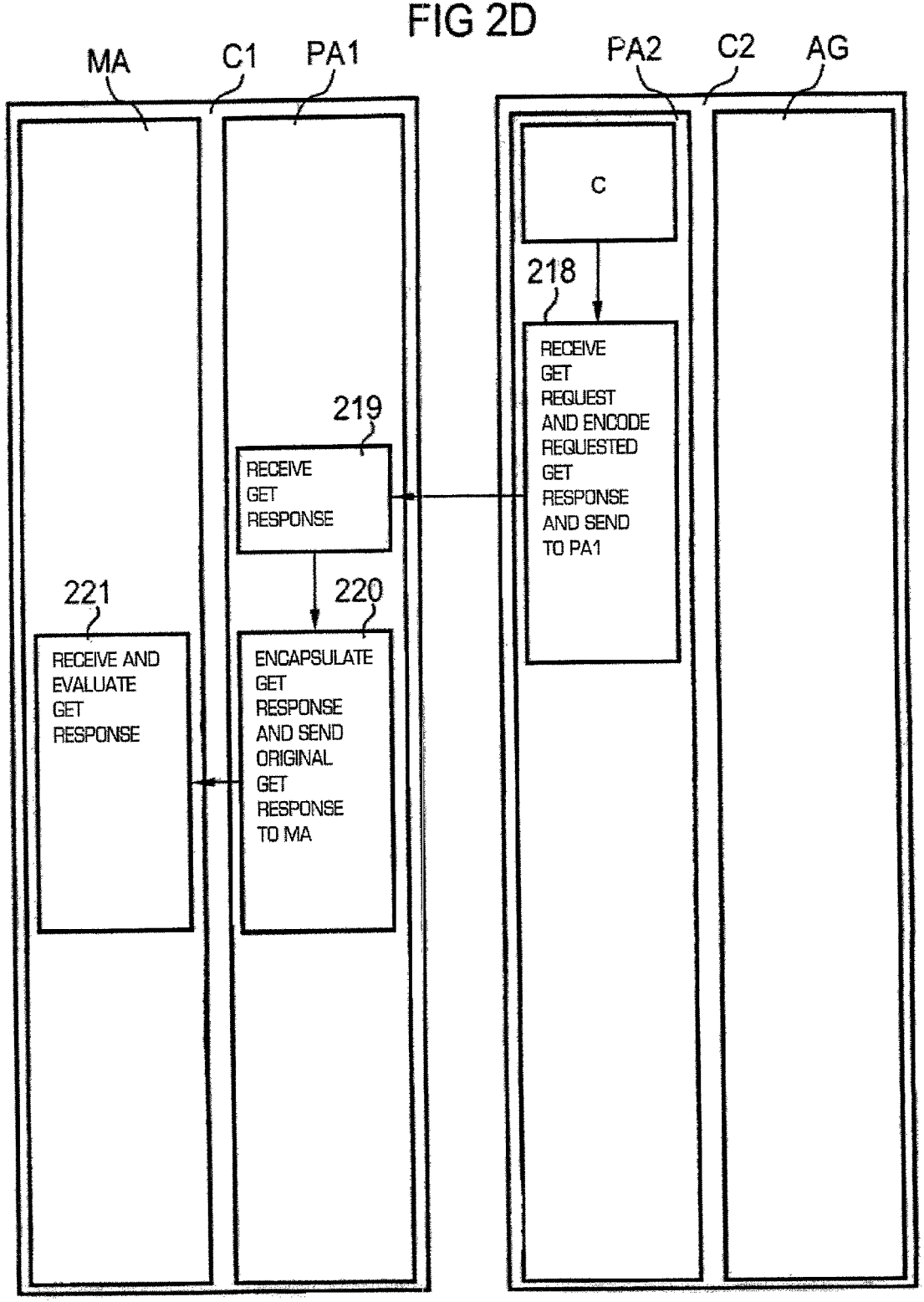

METHOD AND APPARATUS FOR ENCODING, TRANSMITTING AND DECODING A DIGITAL MESSAGE

BACKGROUND OF THE INVENTION

1. Field of the Invention

The present invention relates, generally to a method and apparatus for encoding, transmitting and decoding a digital message and, more specifically, to such a method and apparatus wherein cryptographic security mechanisms are provided which are simpler than those in known methods and arrangements.

2. Description of the Prior Art

Various network protocols are known in the area of managing computer networks. The jobs for the management of computer networks are becoming increasingly more difficult due to both the great spread of computers. The more and more complex networking of computers and the systems for network management required for this purpose also are becoming more and more powerful. The question of security of the network management is acquiring greater and greater significance in the framework of the management of computer networks. The security of the network management is highly dependent on the security techniques employed in the system.

The document (M. Rose, The Simple Book, PTR Prentice Hall, 2nd Edition, ISBN 0-13-177254-6, pages 59-91, 1994) discloses various network protocols for network management, for example the Simple Network Management Protocol (SNMP) in Version 1 (SNMPv1) and in Version 2 (SNMPv2) or the Common Management Internet Protocol (CMIP) as well.

The SNMPv1 has been the most widespread protocol for monitoring and supervision of network components over local computer networks (Local Area Networks, LANs) as well as over global networks (Wide Area Networks, WANs). The SNMPv1 is arranged above the Internet protocols of user datagram protocol (UDP) and Internet protocol (IP) in the framework of the OSI Communication Layer system. Both the UDP and the IP exhibit substantial weaknesses in the area of security, since security mechanisms are hardly integrated, or not at all integrated, in these protocols. Below, both the SNMP and CMIP are referred to as network protocol.

The network protocols are employed for the transmission of computer network management information between a first computer unit, which contains what is referred to as a manager, and at least one second computer unit, which contains what is referred to as an agent. In a complex computer network, at least one management station and an arbitrary plurality of computers monitored and supervised by the manager application usually are monitored or, respectively, controlled via the network protocol.

However, network management architectures also are known that include a plurality of hierarchies, for example a plurality of computers that are respectively monitored by one manager, and a plurality of computers that respectively contain a manager application that is monitored or, respectively, controlled by a further computer that contains a higher-ranking manager application. A computer that contains a manager application of the respective network protocol is referred to below as, first computer unit.

Each computer unit that has an agent implemented is referred to below as a second computer unit. It is possible that a computer may be configured both as manager and as agent; correspondingly, the functionalities are contained in the computer. The respective network protocol can be implemented in the computer in hardware as well as in software.

A simple hierarchy is assumed below; i.e., only that case is described wherein a first computer unit as manager monitors or, respectively, controls an arbitrary plurality of second computer units, the agents. This, however, only serves the purpose of a simpler presentation. It is possible also to apply the present invention in an architecture having an arbitrary plurality of hierarchy levels.

In the network protocols, either an information query is transmitted from the first computer unit to the second computer unit, or a control value is transmitted for the control or, respectively, supervision of the second computer unit. It is standard in each second computer unit, given the known network protocols, that the information employed by the second computer unit in the framework of the network protocol is stored in the form of what is referred to as a management information base (MIB), which exhibits the structure of a hierarchic data bank.

The overall structure of the management information of the network protocols is stored in what is referred to as a global registration tree; for example, the global SNMP registration tree. The MIB of an agent (a second computer unit), is a part of the registration tree of the respective network protocol.

Digital messages, for example an SNMPv1 message, are employed for the transmission of information between the first computer unit and the second computer unit. An SNMPv1 message contains a version number, what is referred to as a community string, and an SNMPv1 protocol data unit (PDU). The version of the network protocol employed is indicated with the version number. The version number is defined upon implementation of the respective network protocol.

The community string in the SNMPv1 serves as a password for access to an MIB of a second computer unit. The community string given SNMPv1 is sent to the agent unencrypted. A check is carried out in the agent (i.e., the second computer unit), to see whether the community string that was respectively received together with an SNMPv1 message authorizes an access in the MIB of the second computer. Since the password is transmitted unencrypted given SNMPv1, a misuse of the community string is easily possible; for example, for masking a potential attacker and for unauthorized access to a second computer unit. Such is the case since it is very simple for a potential attacker to tap the community string together with an IP sender address of an authorized user.

SNMPv1 thus has practically no effective security mechanism integrated in it, particularly no effective authentication of the SNMPv1 manager, and, as a consequence of the lacking authentication, has no dependable access control on the part of the agent. Further, SNMPv1 contains no possibility for implementing security mechanisms of the data integrity or of the data confidentiality. It is, thus, possible for a potential attacker to simply listen in to transmitted SNMP-PDUs and to misuse the transmitted information between manager and agent. The encoding rules of the network protocols are described in detail in M. Rose, The Simple Book, PTR Prentice Hall, 2nd Edition, ISBN 0-13-177254-6, pages 59-91, 1994.

In the second version of SNMP, SNMPv2, various security measures were, in fact, provided but the administration of cryptographic keys was so Involved that this problem led to the SNMPv2 being incapable of prevailing in the marketplace over the SNMPv1 despite considerably greater possibilities for the administration of computer networks compared to SNMPv1. The original SNMPv2 standard was therefore withdrawn and replaced by a modified standard wherein no security was integrated.

CMIP, which due to generally significantly greater complexity compared to SNMPv1 and SNMPv2, was hardly considered in products was incapable of prevailing in the marketplace. Further, the concept of what is referred to as proxy agents is likewise described in the document of (M. Rose, The Simple Book, PTR Prentice Hall, 2nd Edition, ISBN 0-13-177254-6, page 315, 1994).

SUMMARY OF THE INVENTION

The present invention is, therefore, based on the problem of specifying a method and apparatus for the encoding, transmission and decoding of a digital message, wherein cryptographic security mechanisms are provided that are simpler than in the known methods and arrangements.

Accordingly, in an embodiment of the present invention, a digital message that is to be transmitted from the first computer unit to the second computer unit is encoded into an encoded message upon employment of an encoding format of a network protocol. The encoded message is subjected to at least one cryptographic process wherein the cryptographically processed, encoded message is again encoded upon employment of the encoding format of the network protocol.

Given the encoded message described above, such message is decoded according to the encoding format of the network protocol. Further, the decoded, cryptographically processed message is subjected to a cryptographic method inverse relative to the at least one cryptographic method. The inversely cryptographically processed message is then decoded according to the encoding format of the network protocol.

In a further embodiment of the method, a digital message that is to be transmitted from the first computer unit to the second computer unit is encoded into an encoded message upon employment of an encoding format of a network protocol. The encoded message is subjected to at least one cryptographic process and the cryptographically processed, encoded message is again encoded upon employment of the encoding format of the network protocol. After the encoding has occurred, the entire message is transmitted from the first computer unit to at least the second computer unit. The received message is decoded in the second computer unit according to the encoding format of the network protocol. Subsequently, the decoded message is subjected to the cryptographic process inverse relative to the cryptographic process employed. In a last step, the inversely cryptographically processed message is decoded according to the encoding format of the network protocol.

As a result of the "double" encoding or, respectively, decoding with the respective network protocol, a very simple solution conforming to the standards is proposed in order to cryptographically secure the transmission of messages of a network protocol. The method also exhibits the considerable advantage of being easily implemented with the assistance of a computer. A further advantage is that the network protocols can remain unmodified and no new network protocols need be defined. Thus, no complicated version switching or even redefinition of network protocols is required. The cryptographic security of the respective network protocol can be enhanced substantially without greater outlay.

In an embodiment of the present invention, a computer system contains at least one computer unit that is configured such that the above-described methods are implemented. Such computer system includes at least the following components:

means for encoding the digital message upon employment of the encoding format of the network protocol to form an encoded message;

means for cryptographically processing the encoded message; and means for encoding the cryptographically processed message upon employment of the encoding format of the network protocol.

In an embodiment, the computer system also may include at least the following components:

means for receiving twice encoded, cryptographically processed message from the first computer unit;

means for decoding the received message according to the encoding format of the network protocol;

means for inversely cryptographically processing the decoded, cryptographically processed message; and means for decoding the inversely cryptographically processed message according to the encoding format of the network protocol.

In another embodiment, the computer system also may include at least the following components:

a first computer unit that includes at least the following components:

means for encoding the digital message upon employment of an encoding format of a network protocol to form an encoded message;

means for cryptographically processing the encoded message;

means for encoding the cryptographically processed message upon employment of the encoding format of the network protocol; and means for sending the encoded, cryptographically processed message from the first computer unit to the second computer unit; and a second computer unit that includes at least the following components:

means for receiving the encoded cryptographically processed message from the first computer unit;

means for decoding the received message according to the encoding format of the network protocol;

means for inversely cryptographically processing the decoded, cryptographically processed message; and means for decoding the inversely cryptographically processed message according to the encoding format of the network protocol.

The computer systems, thus, exhibit the same type of advantages as described above in conjunction with the methods of the present invention.

The methods of the present invention can be advantageously employed in conjunction with SNMPv1 as network protocol, sine; practically no cryptographic security was previously present for SNMPv1.

However, such methods and the corresponding arrangement for the implementation of the such methods also can be employed in other network protocols since the overall complexity of the respective network protocol therein also is considerably reduced.

Further, it is advantageous in the computer system of the present invention to configure a means for cryptographically processing the encoded message, a means for encoding the cryptographically processed message upon employment of the encoding format of the network protocol as well as a means for sending the encoded, cryptographically processed message to the second computer unit as what is referred to as a proxy agent. Such proxy agent is connected to the means for encoding the digital message upon employment of the network protocol via a communication connection that is assumed to be secure. The first proxy agent and the first computer unit can be embodied either in common in one computer unit or in two different computer units.

In this way, the actualization of a computer system for cryptographically secure transmission of messages of the encoding format of a network protocol is achieved upon employment of the proxy technique, which is known from the document of (M. Rose, The Simple Book, PTR Prentice Hall, 2nd Edition, ISBN 0-13-177254-6, page 315, 1994).

This advantage can be established when a means for the reception of the encoded, cryptographically processed message, a means for the decoding the received message according to the encoding format of the network protocol as well as a means for inversely cryptographically processing the decoded cryptographically processed message are embodied together in a second proxy agent that is connected to the agent of the second computer unit upon employment of the network protocol via a communication connection assumed to be secure.

Additional features and advantages of the present invention are described in, and will be apparent from, the Detailed Description of the Preferred Embodiments and the Drawings.

DESCRIPTION OF DRAWINGS

FIG. 2 shows a flowchart of the method in terms of its method steps with details for a set request;

DETAILED DESCRIPTION OF PREFERRED EMBODIMENT

Get-Request

Figure 1C:
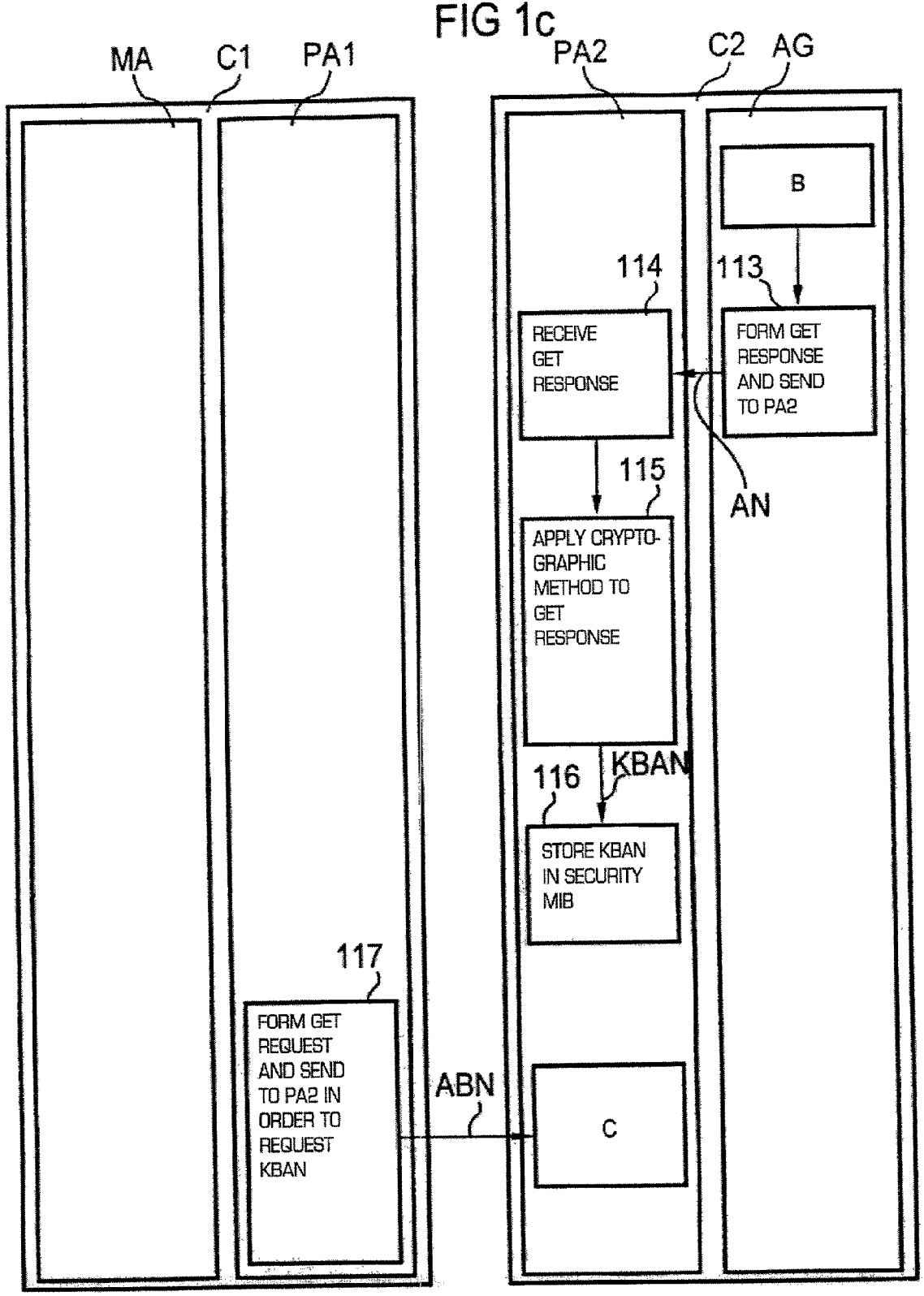
FIG. 1 shows a flowchart of the inventive method with details for a get request.

FIG. 1 symbolically shows a first computer unit C1 and a second computer unit C2. The first computer unit C1 includes a manager application MA of the SNMPv1 as well as a first proxy agent PA1. The second computer unit C2 includes an SNMPv1 agent AG as well as a second proxy agent PA2 at the side of the second computer unit C2.

In a first step 101, a get request is formed in the first computer unit C1. What is to be understood by formation of a get request is that a digital message is encoded upon employment of an encoding format of the SNMPv1 network protocol to form an encoded message, the get request. This occurs in a first means 101 of the first computer unit C1 for encoding the digital message upon employment of the encoding format of the network protocol.

In a second step 102, the get request, i.e. the encoded message CN, is sent from the first means M1 to the first proxy agent PI at the side of the first computer unit C1. In a third step 103, the encoded message CN is received in the first proxy agent PA1. In a fourth step 104, the encoded message CN is subjected to at least one cryptographic process in the first proxy agent PA1. A second means 104 is utilized for the cryptographic processing of the encoded message in the fourth step 104.

What is to be understood by a cryptographic method is any arbitrary cryptographic method; for example, for authentication, for securing the data integrity or for encryption of digital data. For example, the RSA method or the data encryption standard, which is referred to as DES, can be employed. As a result, one obtains a cryptographically processed message KBN whose format is shown, for example, in FIGS. 3 through 6 and explained in greater detail below.

In a fifth step 105, the cryptographically processed message KBN is again encoded upon employment of the encoding format of the SNMP network protocol. What is to be understood by this method step is that the cryptographically processed get request is preferably encoded in a set request; i.e., encapsulated. Further, a third means 105 for the encoding of the cryptographically processed message upon employment of the encoding format of the network protocol is provided.

As becomes clear below, it is advantageous to encode any type of message that is to be transmitted from the first computer unit C1 to the second computer unit C2 as a set request in the fifth step 105. This is so because the syntax of SNMPv1 only allows object identifiers as payload data to be transmitted for a get request. It is not possible in SNMPv1 to involve the cryptographically processed information in an SNMP get request.

In a sixth step 106, the set request is transmitted as encoded, cryptographically processed message CKN from the first computer unit C1 to the second computer unit C2; i.e., from the first proxy agent PA1 to a second proxy agent PA2.

The encoded, cryptographically processed message CKN is received in a seventh step 107 by the second proxy agent PA2 of the second computer unit C2. To this end, a fifth means 107 is provided for the reception of the encoded, cryptographically processed message CKN.

In an eighth step 108, a get response, in conformity with standards, is sent from the second proxy agent PA2 to the first proxy agent PA1 of the first computer unit C1 as a reply to the set request. The get response contains the respective error status as confirmation.

In a ninth step 109, the received, encoded, cryptographically processed message CKN is de-encapsulated, or decoded, upon employment of the encoding format of the network protocol. A sixth means 109 is provided for the decoding of the received message corresponding to the encoding format of the SNMPv1 protocol.

In a tenth step 110, the second proxy agent PA2 applies the cryptographic process inverse relative to the respectively provided cryptographic process, for example for authentication, for decryption or, respectively, for securing the integrity of the transmitted data, onto the decoded, cryptographically processed message DKN. A seventh means 110 for the inverse cryptographic processing of the decoded, cryptographically processed message DKN is provided for this purpose.

Further, the inversely cryptographically processed message IKN, i.e. the original get request, is sent from the second proxy agent PA2 to the agent application AG of the second computer unit C2.

In an eleventh step 111, the get request is received by the agent AG. An eighth means 111 for reception of the get request is provided for this purpose.

In a further step 112, the Inversely cryptographically processed message is decoded according to the encoding format of the SNMPv1 protocol to form the digital message; i.e., is Interpreted. This means that, for the specific instant of the get request, the information requested via the get request, namely of a value of what is referred to as a managed object (MO) that is stored in the MIB of the agent AG, is read out. The particulars as to what information is, in fact, requested is contained in the original get request as object identifier.

The requested action, the read out of the requested information in this case, a value of a managed object, is thus implemented in the twelfth step 112. To this end, a ninth means 112 is provided for the implementation of the requested action.

As provided in SNMPv1, a get response is formed by the agent AG in the second computer unit as a reply to a get request and, in a thirteenth step 113, is sent to the second proxy agent PA2. The get response contains the result of the action that was requested by the first computer unit C1 in the get request.

The get response is referred to below as reply message AN. The reply message AN either can be transmitted directly to the first computer unit C1 or, for further enhancement of the cryptographic security, can be encoded again in conformity with the encoding format of the network protocol. A tenth means 112 for sending the result of the action to the first computer unit C1 is provided in the second computer unit C2.

Further, an eleventh means 113 is provided for forming the reply message AN that contains the result of the action and for encoding the reply message AN according to the encoding format of the SNMPv1 protocol.

In a fourteenth method step 114, the second proxy agent PA2 receives the reply message AN. A twelfth means 114 for the reception of the reply message AN is provided for this purpose In a fifteenth step 115, the encoded reply message AN is subjected to at least one cryptographic process. For this purpose, a thirteenth means 115 is provided for processing the reply message AN with at least one cryptographic process. The result of this method step is a get response encapsulated in a security frame. The cryptographically processed reply message KBAN is stored in a security MIB In the second processing agent PA2 (step 116). The structure of the security MIB is described in greater detail later.

In order to obtain to the cryptographically processed reply message KBAN, the first proxy agent PA1 of the first computer unit C1 forms a get request; i.e., a fetch message ABN. To this end, a fourteenth means 117 is provided for forming and encoding the fetch message ABN according to the encoding format of the SNMPv1 protocol, the cryptographically processed reply message KBAN being requested therewith from the second computer unit C2. Further, the encoded fetch message ABN is sent from the first computer unit C1 to the second computer unit C2.

In an eighteenth step 118, the fetch message ABN, i.e. the get request in this case, is received in the second proxy agent PA2 and, in conformity with the standard, the standard get response, which contains the cryptographically processed reply message KBAN in this case, is sent to the first proxy agent PA1. To this end, a fifteenth means 118 is provided in the second computer unit C2 for receiving the fetch message ABN and for encoding the cryptographically processed reply message KBAN requested in the fetch message ABN according to the encoding format of the SNMPv1 protocol; i.e., for encoding the requested get response.

The encoded, cryptographically processed reply message is transmitted from the second proxy agent PA2 to the first proxy agent PA1.

In a further step 119, the encoded, cryptographically processed reply message contained in the standard-conforming get response is received in the first proxy agent PA1. A sixteenth means 119 for receiving the get response is provided for this purpose In the first computer unit C1.

In a further step 120, the get request is decoded, or de-encapsulated, and the get response originally formed by the agent AG of the second computer unit C2 is sent to the manager application MA of the first computer unit C1. A seventeenth means 120 for decoding the get response and for sending the original get response that contains the requested information is provided for the manager application MA.

In a last step 121, the get response is received by the manager application MA and the requested value is interpreted and stored. An eighteenth means 121 for receiving and evaluating management information is provided for this purpose in the manager application MA.

What is achieved in this way is that a cryptographic securing of the communication becomes possible without great added outlay and without having to modify the method of the SNMPv1 protocol.

Get-Next-Request

For a get next request, which is likewise provided within the framework of the SNMPv1 protocol, the method is implemented in the same way as described for the get request, merely with a modified and correspondingly adapted object identifier for the requested value of the respective managed object.

Set-Request

FIG. 2 shows the method for a set request as encoded, digital message CN. For simpler explanation, only the method is described below; the means are correspondingly arranged such that the individual method steps can be implemented with the computer units C1, C2.

In a first step 201, the set request, i.e. the digital message, is encoded.

In a second step 202, the manager MA of the first computer unit sends the set request, i.e. the encoded message CN, to the first proxy agent PA1.

In a third step 203, the encoded message CN is received by the first proxy agent PA1.

In a fourth step 204, a cryptographic process is applied to the encoded message CN. The result of the cryptographic processing is a cryptographically processed message KBN.

In a fifth step 205, the cryptographically processed message KBN is again encoded upon employment of the encoding format of the SNMPv1 protocol to form an encoded, cryptographically processed message CKN. A set request is again employed for this purpose.

The set request is sent from the first proxy agent PA1 to the second proxy agent PA2 (step 206).

In a seventh step 207, the second proxy agent PA2 receives the set request.

As a reaction to the reception of the set request, the second proxy agent PA2 sends a get response in conformity with the standard that contains the error status as confirmation (step 208).

In a further step 209, the encoded, cryptographically processed message is decoded; i.e., "unpacked". The result is the decoded, cryptographically processed message DKN.

In a tenth step 210, the cryptographic method respectively inverse relative to the cryptographic method employed is applied to the cryptographically processed message DKN. Further, the inversely cryptographically processed message IKN, i.e. the original set request, is sent from the second proxy agent PA2 to the agent AG of the second computer unit C2.

In an eleventh step 211, the agent AG receives the inversely cryptographically processed message IKN and, in a further step 212, the action Indicated in the set request is implemented.

As reaction, the agent AG of the second computer unit CU sends the reply message AN in the form of a get response to the second proxy agent PA2 in conformity with the standard (step 213).

In a fourteenth step 214, the second proxy agent PA2 receives the reply message AN.

In a fifteenth step 215, at least one prescribable cryptographic method is again applied to the reply message AN.

The further method steps 216, 217, 218, 219, 220 and 221 respectively correspond to the method steps 116, 117, 118, 119, 120 and 121 described in conjunction with a get request method.

The security MIB contains entries that employ the usual syntax for describing managed objects in their structure. Entries in the security MIB are assigned unambiguous object identifiers that are employed for the unambiguous identification of the entries in the security MIB. The object identifiers are registered in the global SNMP-MIB. What is thus achieved is that the purpose and the syntax of the respective managed object is known. The various entries of the security MIB can contain, for example, either digitally signed, integrity-protected or encrypted management information. Of course, arbitrary combinations of the above-described mechanisms can be entered in the security MIB and, thus, can be taken into consideration in the framework of the method.

A possible exemplary syntax in AS1.1 (abstract syntax notation one) of such a security MIB is presented below.

The syntax of a secure, encapsulated managed object is OCTET STRING. The structure of such an encapsulated managed object is as follows:

SecureMO ::=
   SEQUENCE{
     PlainHeader,
     EncapsulatedData
   }

PlainHeader ::=
   SEQUENCE{
     SecurityAssociationID,
     UsedAlgorithms,
     AlgorithmParameters
   }

EncapsulatedData ;;=OCTET STRING
   signed, encrypted, or integrity protected
   ASN.1-encoded data SecurityAssociationID::=OBJECT IDENTIFIER UsedAlgorithms ::=INTEGER (0.7)
   value 0 stands for "no security"
   value 1 stands for "signed"
   value 2 stands for "integrity protected"
   value 3 stands for "signed" and "integrity protected"
   value 4 stands for "encrypted"
   value 5 stands for "signed" and "encrypted"
   value 6 stands for "integrity protected" and "encrypted"
   value 7 stands for "signed", "integrity protected" and "encrypted"

AlgorithmParameters ::=
   necessary parameters for the particular
   algorithms in use The value of the parameter UsedAlgorithms is formed according to the following strategy. It can be represented as a bit string having the length of 3 bits, whereby the bit of least significance indicates the employment of digital signature ("signed"); the bit having the second lowest significance indicates, for example, whether mechanisms for the protection of the data integrity are provided ("integrity protected"); and the bit having the highest significance describes whether the data were encrypted.

Thus, the result of every cryptographic processing of a message can be described as a bit string having the length 3. The cryptographically processed message is encoded as OCTET STRING. When it is composed of a plurality of bits not divisible by 8, however, it can be expanded into an OCTET STRING by employing what is referred to as padding; i.e., filling bits in without semantic significance.

Figure 3:
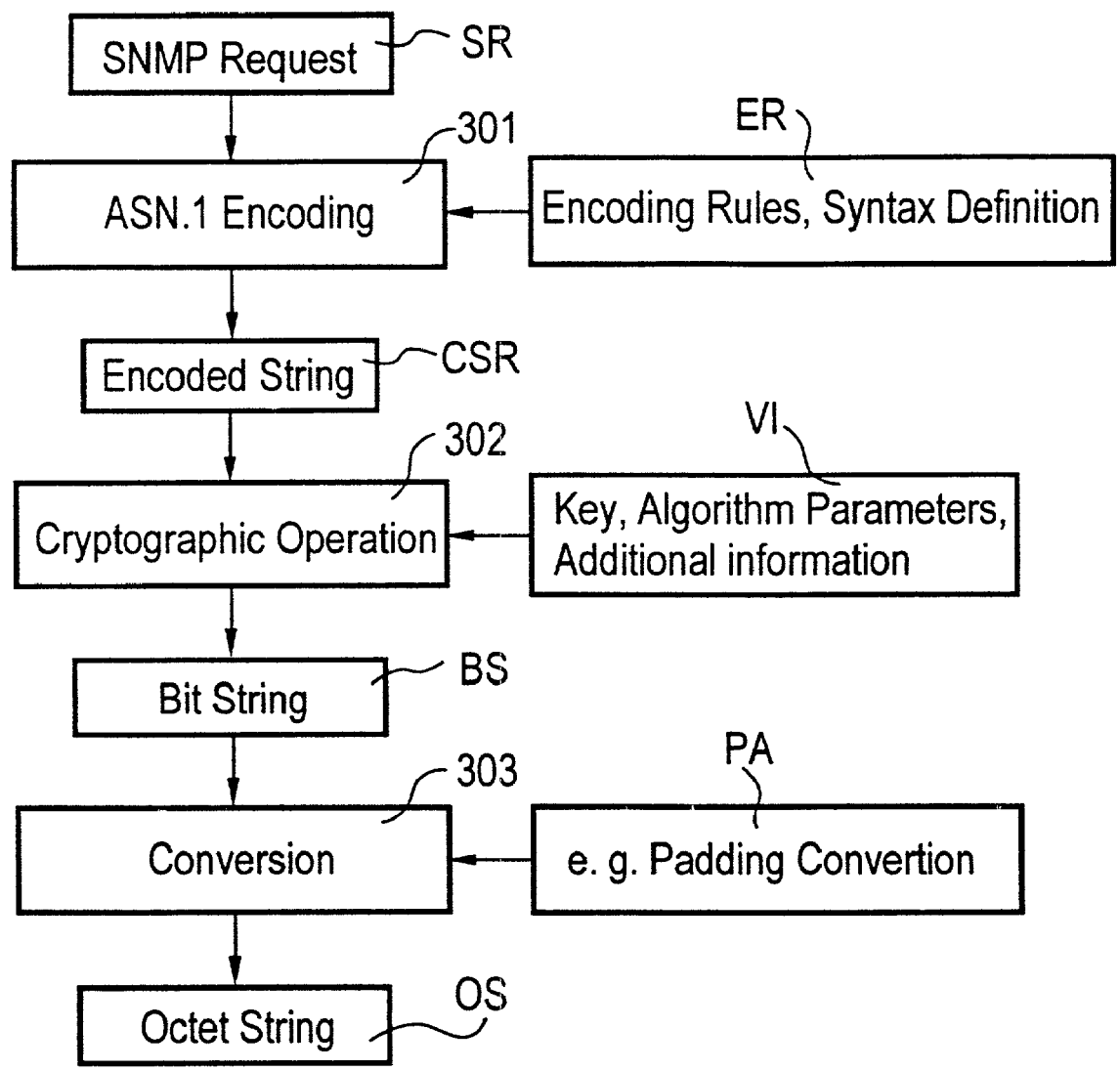
FIG. 3 shows a flowchart of the method in abstract form.

This situation is shown by way of example in a flowchart in FIG. 3.

An SNMPv1 request SR is encoded 301 into ASN.1 (encoding rules, syntax definition, ER) according to the rules for encoding of the respective network protocol. The encoded SNMP request CSR, i.e. the encoded message CN, is subjected to the respective cryptographic process in a second step 302. For example, cryptographic keys, parameters for indicating the algorithm employed, as well as additional information, general cryptographic information VI, for the implementation of the respective cryptographic method are thereby employed.

The deriving bit string BS is converted into an OCTET STRING OS by, for instance, filling with filler bits in a step 303; for example, upon employment of padding PA.

The abstract procedure for the inverse cryptographic processing is correspondingly inversely implemented.

It is advantageous to apply existing functions for the protection of the communication in the framework of SNMPv1 where it is possible and to strengthen these security functions with further cryptographic processes as necessary.

Thus, it is advantageous to employ the concept of community strings in SNMPv1 in the framework of this method as well. In the framework of the concept of a community, groups are defined and access rights for the respective members of the group are allocated to the individual groups. A community and the access rights allocated to the community are part of a configuration of an SNMPv1 agent. It is advantageous to respectively associate communities with specific security mechanisms. Thus, for example, it is possible to assign different cryptographic algorithms, cryptographic keys and corresponding parameters that are respectively employed in the framework of the cryptographic method to members of the community in a community.

Standard-conforming object identifiers are preferably employed as particulars that are to be employed in the cryptographic processes.

In the security configuration, object identifiers are preferably applied to stored cryptographic keys instead of cryptographic keys—these being referred to below as key identifiers. The respective key material is protected better as a result of this procedure.

Further, the respective key material can, thereby, be more highly protected in that, for example, the data files wherein the cryptographic keys are maintained are encrypted or specific hardware units are provided for the protection of the cryptographic keys; for example, chip cards.

Further details to be respectively employed derive from the security policy, which can vary greatly in conformity with the application.

Authentification of the Data Source

Figure 4:
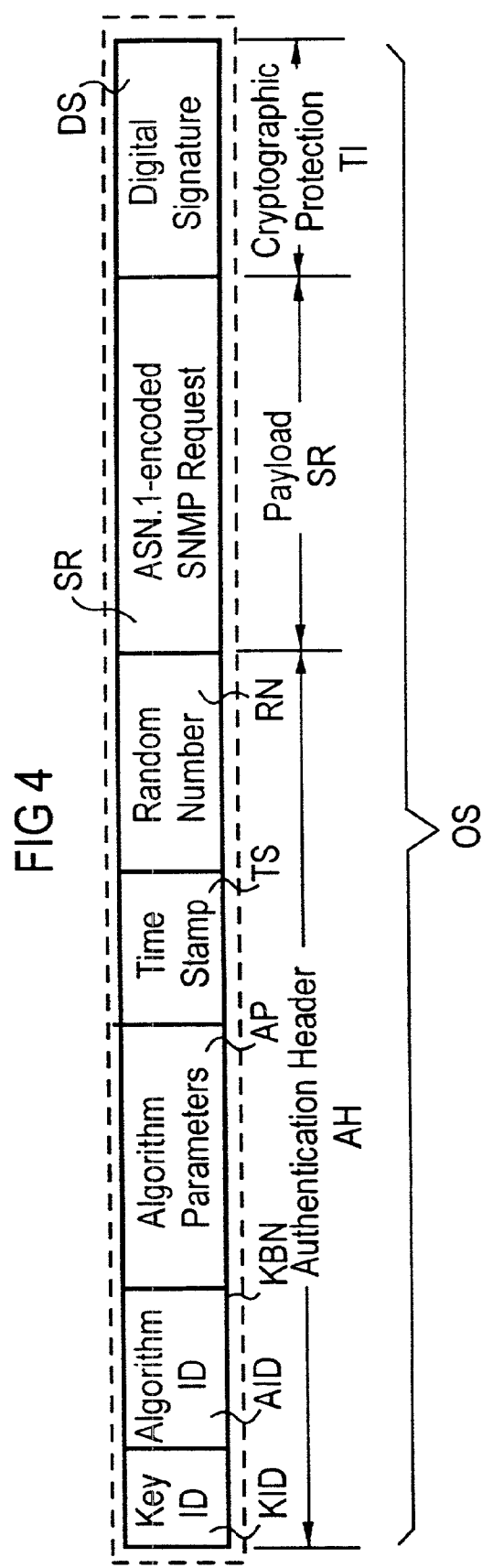
FIG. 4 shows a schematic illustration of a possible structure of a cryptographically processed SNMPv1 message wherein the security mechanism of authentication of the original data is effected.
Figure 5:
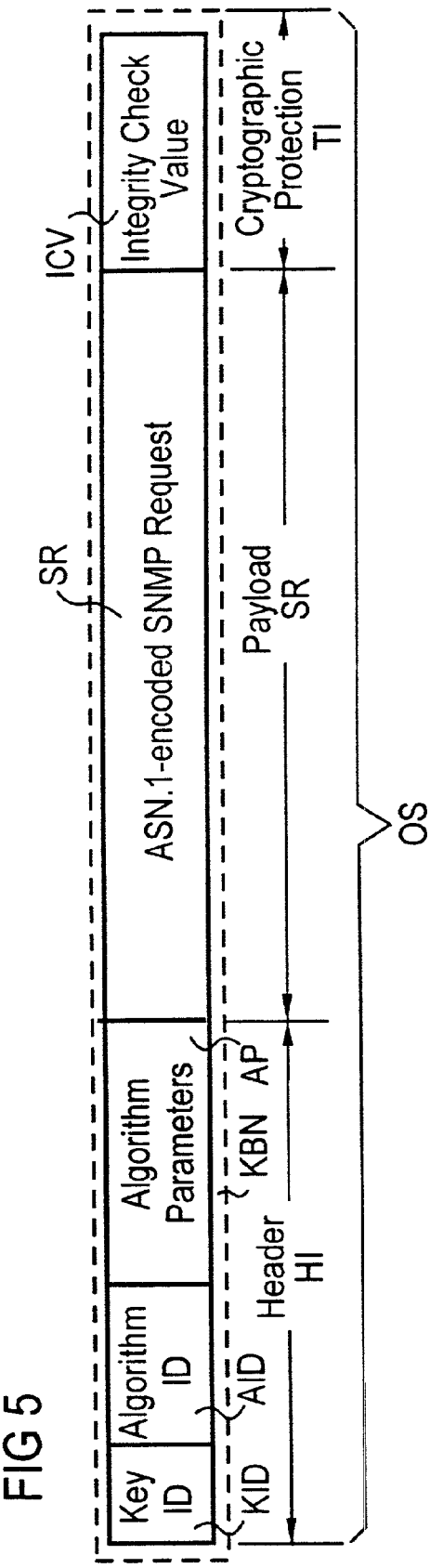
FIG. 5 shows the structure of a possible, cryptographically processed SNMPv1 message with which the security services of integrity and confidentiality of the transmitted SNMPv1 message are effected.
Figure 6:
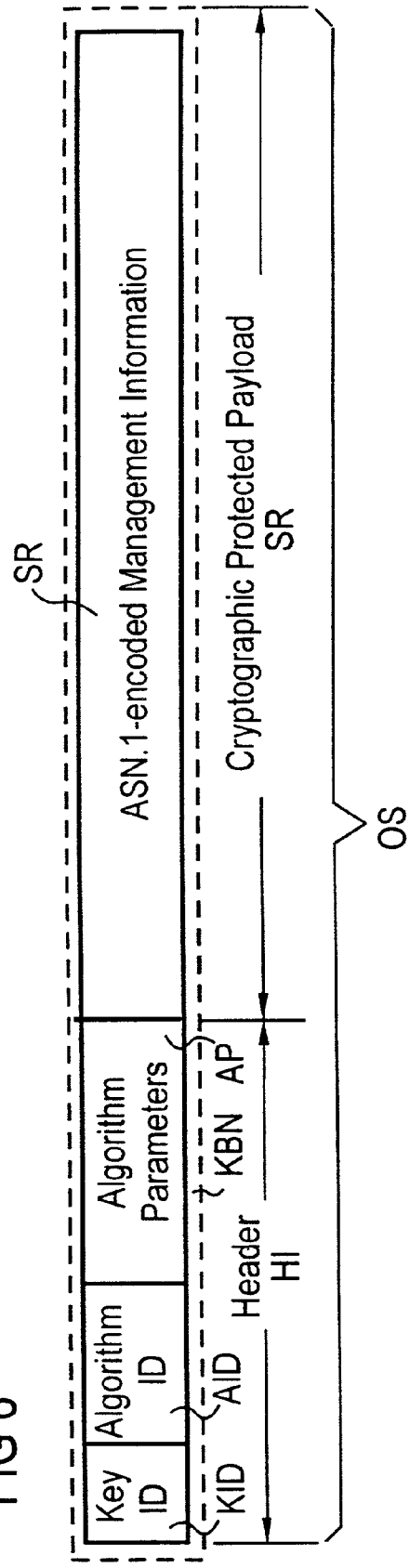
FIG. 6 shows the possible structure of a cryptographically processed SNMPv1 message wherein the security service of confidentiality of the SNMPv1 message is effected.

In order to achieve the security service of authentification of the source data, the following information can, for example, be provided in the cryptographically processed message (see FIG. 4).

The SNMPv1 request, i.e. the encoded message CN, is encapsulated with the following header or, respectively, trailer information by the cryptographic processing. As a result the cryptographically processed message KBN arises.

An authentification header AH contains a key identifier KID with which the cryptographic key to be respectively employed is indicated via an object identifier, an algorithm identifier AID with which the respective cryptographic algorithm to be applied for authentification is indicated, algorithm parameters AP with which the parameters that are to be employed within the framework of the authentification are indicated, a time stamp TS as well as a random number RN.

Further, a digital signature DS is provided as trailer information TI. For example, the asymmetrical RSA method can be employed as algorithm for the authentification.

Access Control for Management Information

The SNMPv1 access control is based on two mechanisms. First, an access control value is allocated to each managed object in an MIB, this including one of the three following values:

read only;
read-write;
write only; or
not accessible.

Second, what is referred to as an MIB viewed together with the respective access rights is allocated to each community in the SNMPv1 agent configuration. An MIB view contains a prescribable plurality of object identifiers that indicate the respective sub-trees or what are referred to as leaves of the SNMP registration tree.

The respective access rights include one of the following values:

read only;
write only;
read-write; or
none.

Security of the Data Integrity of an SNMP Request

A mechanism for the cryptographic protection of the data integrity is utilized for securing the data integrity. Data integrity checksums are formed over the entire SNMPv1 request or over a part thereof for this purpose. This can occur, for example, with the DES in what is referred to as the cipher block chaining mode (CBC mode). The employment of a 64 bit long initialization value is required for this specific mechanism, this having to be known to every party of the respective security group. The initialization value is part of the algorithm parameter AP that is employed in the header information HI of the cryptographically processed message KBN (see FIG. 5). Further, the header information HI includes a key identifier KID as well as an algorithm identifier AID whose functionality is the same as in the authentification.

Further, an integrity checksum ICV is provided in trailer information TI.

Encryption of SNMPv1 Requests

Confidentiality of the transmitted SNMPv1 data can occur in a way similar to the protection of the data integrity. For example, the DES method in the CBC mode again can be employed for the encryption. In this case, an initialization value is again required as algorithm parameter AP and header information HI of the cryptographically processed message KBN is required (see FIG. 6).

A key identifier KID as well as an algorithm identifier AID having the above-described functionality are again provided in the header information HI.

Further, mechanisms for logging the communication as well as for outputting an alarm when attempted attacks are found can be provided.

The method and the computer system can be employed quite advantageously within the framework of a scenario wherein a vendor of a communication network makes bandwidth of the communication network available to a service provider who makes additional services available to third parties that do not provide the communication network in and of itself. In this context, both the method and the computer system can serve, for example, to control or to account for the resources made available by the vendor of the overall communication network. In this case, the manager will be located on a computer of the vendor of the overall communication network and an agent will be located at the respective provider of additional services.

It is provided in one version of the above described exemplary embodiment to directly encode the reply message without waiting for a fetch message and to send it to the first computer unit. The following steps are thus not required in the second computer unit:

the encoding of a fetch message according to the encoding format of the network protocol in the first computer unit, with which the cryptographically processed reply message is requested from the second computer unit;

the transmission of the fetch message from the first computer unit to the second compute unit; and the reception of the fetch message.

The analogous case applies to the computer system.

Clearly, the method can be described such that a cryptographic process is applied to the standard-conforming network protocol, for example the SNMPv1 protocol, being applied to the respective SNMP request or CMIP request. A cryptographic protection of the SNMP request or, respectively, the CMIP request is achieved with this. In order, however, to enable the employment of standard-conforming SNMP methods, the cryptographically processed message is again encoded with the respective encoding format of the network protocol. This corresponds to a "double" application of the respective network protocol to the message to be encoded.

Although the present invention has been described with reference to specific embodiments, those of skill in the art will recognize that changes may be made thereto without departing from the spirit and scope of the invention as set forth in the hereafter appended claims.

We claim:

1. A method for encoding a digital message on a computer, the method comprising:
   encoding the digital message by a first application executing on the computer to form an encoded message via employment of an encoding format of a simple network management protocol;
   subjecting the encoded message, not a decoded message obtained from the encoded message, to at least one cryptographic process in a proxy agent application executing on the computer to form a cryptographically processed message; and
   encoding the cryptographically processed message via employment of the encoding format of the simple network management protocol.

2. A method for decoding at a computer an encoded, cryptographically processed message that is present in an encoding format of a simple network management protocol, the method comprising:
   decoding at the computer the encoded, cryptographically processed message according to the encoding format of the simple network management protocol to form a decoded, cryptographically processed message;
   subjecting the decoded, cryptographically processed message to a second cryptographic process inverse relative to at least one first cryptographic process by a proxy agent application executing on the computer, which previously encoded an original digital message, to form an inversely cryptographically processed message; and
   decoding the inversely cryptographically processed message by another application executing on the computer according to the encoding format of the simple network management protocol used in said decoding of the cryptographically processed message.

3. A method for encoding a digital message, for transmitting the digital message from a first computer unit to a second computer unit and for decoding the digital message, the method comprising:
   encoding the digital message, by a first application in the first computer unit, to form an encoded message via employment of an encoding format of a simple network management protocol;
   subjecting the encoded message, not a decoded message obtained from the encoded message, by a first proxy agent in the first computer unit, to at least one first cryptographic process to form a cryptographically processed message;
   encoding the cryptographically processed message, in the first computer unit, via employment of the encoding format of the simple network management protocol used to produce the encoded message to form an encoded, cryptographically processed message;
   transmitting the encoded, cryptographically processed message from the first computer unit to the second computer unit;
   decoding the encoded, cryptographically processed message, in the second computer unit, according to the encoding format of the simple network management protocol to form a decoded, cryptographically processed message;
   subjecting the decoded, cryptographically processed message, by a second proxy agent in the second computer unit, to a second cryptographic process inverse relative to the at least one first cryptographic process to form an inversely cryptographically processed message; and
   decoding the inversely cryptographically processed message, by a second application in the second computer unit, into the digital message according to the encoding format of the simple network management protocol.

4. A method for encoding a digital message, for transmitting the digital message from a first computer unit to a second computer unit and for decoding the digital message as claimed in claim 3, further comprising:
   including a request for implementing a prescribable action in the digital message;
   implementing the prescribable action in the second computer unit to obtain a result of the prescribable action; and
   sending the result of the prescribable action from the second computer unit to the first computer unit in a reply message.

5. A method for encoding a digital message, for transmitting the digital message from a first computer unit to a second computer unit and for decoding the digital message as claimed in claim 4, further comprising:
   transmitting as the prescribable action at least one of an information query and an information indication of the second computer unit.

6. A method for encoding a digital message, for transmitting the digital message from a first computer unit to a second computer unit and for decoding the digital message as claimed in claim 3, further comprising:
   including a request for implementing a prescribable action in the digital message;
   implementing the prescribable action in the second computer unit to obtain a result of the prescribable action;
   forming a reply message which contains the result of the prescribable action in the second computer unit;
   encoding the reply message in the second computer unit according to the encoding format of the simple network management protocol to form an encoded reply message;
   subjecting the encoded reply message to at least one cryptographic process in the second computer unit to form a cryptographically processed reply message;
   storing the cryptographically processed reply message in the second computer unit;
   encoding a fetch message in the first computer unit according to the encoding format of the simple network management protocol, wherein the cryptographically processed reply message is requested from the second computer unit with the fetch message;
   transmitting the fetch message from the first computer unit to the second computer unit;
   receiving the fetch message by the second computer unit;
   encoding the cryptographically processed reply message according to the encoding format of the simple network management protocol to form an encoded, cryptographically processed reply message; and
   transmitting the encoded, cryptographically processed reply message from the second computer unit to the first computer unit.

7. A method for encoding a digital message, for transmitting the digital message from a first computer unit to a second computer unit and for decoding the digital message as claimed in claim 6, further comprising:
   employing a get request as the fetch message; and
   forming a get response upon the encoding of the requested, cryptographically processed reply message.

8. A method for encoding a digital message, for transmitting the digital message from a first computer unit to a second computer unit and for decoding the digital message as claimed in claim 3, the method further comprising:

including a request for implementing a prescribable action in the digital message;

implementing the prescribable action in the second computer unit to obtain a result of the prescribable action;

forming a reply message which contains the result of the prescribable action in the second computer unit;

encoding the reply message in the second computer unit according to the encoding format of the simple network management protocol to form an encoded reply message;

subjecting the encoded reply message to at least one cryptographic process in the second computer unit to form a cryptographically processed reply message;

encoding the cryptographically processed reply message according to the encoding format of the simple network management protocol to form an encoded, cryptographically processed reply message; and transmitting the encoded, cryptographically processed reply message from the second computer unit to the first computer unit.

9. A method for encoding a digital message, for transmitting the digital message from a first computer unit to a second computer unit and for decoding the digital message as claimed in claim 8, wherein the cryptographically processed reply message is stored in a management information base in the second computer unit.

10. A method for encoding a digital message as claimed in claim 3, wherein the simple network management protocol is version 1.

11. A method for encoding a digital message as claimed in claim 10, further comprising:

forming a set request in the first computer unit upon encoding the cryptographically processed message; and transmitting the set request from the first computer unit to the second computer unit.

12. An apparatus for encoding, transmitting and decoding a digital message, comprising:

a first computer unit, including means for encoding the digital message via employment of an encoding format of a simple network management protocol by a first application to form an encoded message, means for cryptographically processing the encoded message by a first proxy agent, without decoding the encoded message, to form a cryptographically processed message, means for encoding the cryptographically processed message via employment of the encoding format of the simple network management protocol to form an encoded, cryptographically processed message, and means for sending the encoded cryptographically processed message from the first computer unit to the second computer unit; and a second computer unit, including means for receiving the encoded cryptographically processed message from the first computer unit, means for decoding the encoded cryptographically processed message according to the encoding format of the simple network management protocol to form a decoded cryptographically processed message, means for inversely cryptographically processing the decoded cryptographically processed message by a second proxy agent to form an inversely cryptographically processed message, and means for decoding the inversely cryptographically processed message by a second application according to the encoding format of the simple network management protocol.

13. An apparatus for encoding, transmitting and decoding a digital message as claimed in claim 12, wherein the means for encoding the digital message is further provided as the means for encoding the cryptographically processed message.

14. An apparatus for encoding, transmitting and decoding a digital message as claimed in claim 12, wherein the means for decoding the encoded, cryptographically processed message is further provided as the means for decoding the inversely cryptographically processed message.

15. An apparatus for encoding, transmitting and decoding a digital message as claimed in claim 12, wherein the digital message contains a request for implementing a prescribable action, the apparatus further comprising:

means for implementing the prescribable action to obtain a result of the prescribable action, the means for implementing being provided in the second computer unit; and means for sending the result of the prescribable action to the first computer unit, the means for sending being provided in the second computer unit.

16. An apparatus for encoding, transmitting and decoding a digital message as claimed in claim 12, wherein the digital message contains a request for implementing a prescribable action, the apparatus further comprising:

means for implementing the prescribable action to obtain a result, the means for implementing being provided in the second computer unit;

means for forming a reply message that contains the result of the prescribable action, the means for forming a reply message being provided in the second computer unit;

means for encoding the reply message according to the encoding format of the network protocol to form an encoded reply message, the means for encoding the reply message being provided in the second computer unit;

means for processing the encoded reply message with at least one cryptographic process to form a cryptographically processed encoded reply message, the means for processing the encoded reply message being provided in the second computer unit;

means for storing the cryptographically processed encoded reply message, the means for storing being provided in the second computer unit;

means for forming and encoding a fetch message according to the encoding format of the network protocol wherein the cryptographically processed encoded reply message is requested from the second computer unit, the means for forming and encoding a fetch message being provided in the first computer unit;

means for sending the fetch message from the first computer unit to the second computer unit, the means for sending the fetch message being provided in the first computer unit;

means for receiving the fetch message, the means for receiving the fetch message being provided in the second computer unit;

means for encoding the cryptographically processed reply message requested in the fetch message according to the encoding format of the network protocol, the means for encoding the cryptographically processed reply message being provided in the second computer unit; and means for sending the encoded, cryptographically processed reply message from the second computer unit to the first computer unit, the means for sending the encoded, cryptographically processed reply message being provided in the second computer unit.

17. An apparatus for encoding, transmitting and decoding a digital message as claimed in claim 16, wherein the cryptographically processed reply message is stored in a management information base.

18. An apparatus for encoding, transmitting and decoding a digital message as claimed in claim 16, wherein the means for forming and encoding the fetch message is configured such that a get request is formed, and wherein the means for encoding the cryptographically processed reply message requested in the fetch message is configured such that a get response is formed.

19. An apparatus for encoding, transmitting and decoding a digital message as claimed in claim 12, wherein the digital message contains a request for implementing a prescribable action, the apparatus further comprising:
- means for implementing the prescribable action to obtain a result of the prescribable action, the means for implementing the prescribable action being provided in the second computer unit;
- means for forming a reply message that contains the result of the prescribable action, the means for forming the reply message being provided in the second computer unit;
- means for encoding the reply message according to the encoding format of the network protocol to form an encoded reply message, the means for encoding the reply message being provided in the second computer unit;
- means for processing the encoded reply message with at least one cryptographic process to form a cryptographically processed encoded reply message, the means for processing the encoded reply message being provided in the second computer unit;
- means for encoding the cryptographically processed encoded reply message according to the encoding format of the network protocol to form an encoded, cryptographically processed encoded reply message, the means for encoding the cryptographically processed encoded reply message being provided in the second computer unit; and
- means for sending the encoded, cryptographically processed encoded reply message from the second computer unit to the first computer unit, the means for sending the encoded, cryptographically processed encoded reply message being provided in the second computer unit.

20. An apparatus for encoding, transmitting and decoding a digital message as claimed in claim 12, wherein the simple network management protocol is version 1, and wherein the means for encoding the cryptographically processed message is configured such that a set request is formed upon the encoding of the cryptographically processed message.

21. An apparatus for encoding, transmitting and decoding a digital message as claimed in claim 12, wherein the simple network management protocol is version 1.

22. An apparatus for encoding, transmitting and decoding a digital message as claimed in claim 12,
wherein the digital message contains at least one of an information query and an information particular of the second computer unit in a request for implementing a prescribable action.

23. An apparatus for encoding, transmitting and decoding a digital message as claimed in claim 22, wherein the means for cryptographically processing the encoded message, the means for encoding the cryptographically processed message and the means for sending the encoded cryptographically processed message are formed together as a first proxy agent, and wherein the means for receiving the encoded cryptographically processed message, the means for decoding the encoded cryptographically processed message and the means for inversely cryptographically processing the decoded cryptographically processed message are formed together as a second proxy agent.

24. A communication system having a manager of a communication network and an intermediate manager of a communication network, the communication system employing the communication network and offering further services that proceed beyond services offered by the communication network to customers, the communication system including an apparatus for encoding, transmitting and decoding a digital message, the apparatus comprising:
- a first computer unit, including means for encoding the digital message via employment of an encoding format of a simple network management protocol by a first application to form an encoded message, means for cryptographically processing the encoded message, without decoding the encoded message, to form a cryptographically processed message by a first proxy agent, means for encoding the cryptographically processed message via employment of the encoding format of the simple network management protocol to form an encoded, cryptographically processed message, and means for sending the encoded cryptographically processed message from the first computer unit; and
- a second computer unit, including means for receiving the encoded cryptographically processed message from the first computer unit, means for decoding the encoded cryptographically processed message according to the encoding format of the simple network management protocol to form a decoded cryptographically processed message, means for inversely cryptographically processing the decoded cryptographically processed message by a second proxy agent to form an inversely cryptographically processed message, and means for decoding the inversely cryptographically processed message by a second application according to the encoding format of the simple network management protocol.

25. At least one computer-readable medium encoded with a computer program that when executed causes at least one computer to perform a method comprising:
- encoding the digital message via employment of an encoding format of a simple network management protocol by an application to form an encoded message;
- cryptographically processing the encoded message, without decoding the encoded message, to form a cryptographically processed message by a proxy agent; and
- encoding the cryptographically processed message via employment of the encoding format of the simple network management protocol used to produce the encoded message.

26. At least one computer-readable medium as claimed in claim 25, wherein the simple network management protocol is version 1.

27. At least one computer-readable medium as claimed in claim 26, said encoding of the cryptographically processed message includes forming a set request.

28. At least one computer-readable medium encoded with a computer program that when executed causes a computer to decode an encoded, cryptographically processed message that is present in an encoding format of a simple network management protocol by performing a method comprising:
- receiving the encoded, cryptographically processed message from a first computer unit;

decoding the encoded, cryptographically processed message according to the encoding format of the simple network management protocol to form a decoded, cryptographically processed message;

inversely cryptographically processing the decoded, cryptographically processed message by a proxy agent to form an inversely cryptographically processed message; and decoding the inversely cryptographically processed message by an application according to the encoding format of the simple network management protocol.

29. At least one computer-readable medium as claimed in claim 28, wherein the simple network management protocol is version 1.

30. An apparatus for encoding a digital message, the apparatus comprising:

a programmed processing device encoding the digital message via employment of an encoding format of a simple network management protocol by an application to form an encoded message, cryptographically processing the encoded message, without decoding the encoded message, to form a cryptographically processed message by a proxy agent, and encoding the cryptographically processed message via employment of the encoding format of the simple network management protocol used to produce the encoded message.

31. An apparatus as claimed in claim 30, wherein the simple network management protocol is version 1.

32. An apparatus as claimed in claim 31, wherein said programmed processing device further produces a set request upon the encoding of the cryptographically processed message.

33. An apparatus for decoding an encoded, cryptographically processed message that is present in an encoding format of a simple network management protocol and is received from a computer unit, said apparatus comprising:

an interface receiving the encoded, cryptographically processed message from the computer unit; and a programmed processor, coupled to the interface, decoding the encoded, cryptographically processed message according to the encoding format of the simple network management protocol to form a decoded, cryptographically processed message, inversely cryptographically processing the decoded, cryptographically processed message by a proxy agent to form an inversely cryptographically processed message, and decoding the inversely cryptographically processed message by an application according to the encoding format of the simple network management protocol.

34. An apparatus as claimed in claim 33, wherein the simple network management protocol is version 1.

35. A communication system having a manager of a communication network and an intermediate manager of a communication network, the communication system employing the communication network and offering further services that proceed beyond services offered by the communication network to customers, the communication system including an apparatus for encoding a digital message which comprises:

a programmed processing device encoding the digital message via employment of an encoding format of a simple network management protocol by an application to form an encoded message, cryptographically processing the encoded message, without decoding the encoded message, to form a cryptographically processed message by a proxy agent, and encoding the cryptographically processed message via employment of the encoding format of the simple network management protocol used to produce the encoded message.

36. A communication system having a manager of a communication network and an intermediate manager of a communication network, the communication system employing the communication network and offering further services that proceed beyond services offered by the communication network to customers, the communication system including an apparatus for decoding an encoded, cryptographically processed message that is received in an encoding format of a simple network management protocol from a computer unit, the apparatus comprising:

an interface receiving the encoded, cryptographically processed message from the computer unit; and a programmed processor decoding the encoded, cryptographically processed message according to the encoding format of the simple network management protocol to form a decoded, cryptographically processed message, inversely cryptographically processing the decoded, cryptographically processed message by a proxy agent to form an inversely cryptographically processed message, and decoding the inversely cryptographically processed message by an application according to the encoding format of the simple network management protocol.

* * * * *